(12) United States Patent
Noda (10) Patent No.: US 6,597,531 B2
(45) Date of Patent: Jul. 22, 2003

(54) LOW-PROFILE MAGNETIC DISK DRIVE

(75) Inventor: Shunji Noda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/741,376

(22) Filed: Dec. 21, 2000

(65) Prior Publication Data

US 2001/0006440 A1 Jul. 5, 2001

(30) Foreign Application Priority Data

Dec. 22, 1999 (JP) .......................................... 11-363683

(51) Int. Cl.$^7$ ................................................ G11B 17/02
(52) U.S. Cl. ................................ 360/97.01; 360/98.07
(58) Field of Search ........................... 360/97.01, 97.02, 360/97.03, 97.04, 98.01, 98.02; 361/395, 396, 397, 398, 393

(56) References Cited

U.S. PATENT DOCUMENTS

| | | | | |
|---|---|---|---|---|
| 5,396,384 A | * | 3/1995 | Caldeira et al. | 360/98.01 |
| 5,768,049 A | * | 6/1998 | Morehouse et al. | 360/97.01 |
| 5,995,321 A | * | 11/1999 | Ishida | 360/97.01 |
| 6,069,766 A | * | 5/2000 | Battu et al. | 360/97.01 |
| 6,108,162 A | * | 8/2000 | Amirkiai et al. | 360/97.01 |
| 6,219,909 B1 | * | 4/2001 | Ogawa et al. | 174/52.4 |
| 6,351,343 B1 | * | 2/2002 | Nakagawa et al. | 360/97.01 |

FOREIGN PATENT DOCUMENTS

| | | |
|---|---|---|
| JP | A 61-282919 | 12/1986 |
| JP | A 3-62389 | 3/1991 |
| JP | U 4-12191 | 1/1992 |
| JP | A 6-224533 | 8/1994 |
| JP | A 7-14375 | 1/1995 |
| JP | U 3020345 | 11/1995 |
| JP | 9-115279 | 5/1997 |

* cited by examiner

Primary Examiner—Allen Cao
Assistant Examiner—Dzung C. Nguyen
(74) Attorney, Agent, or Firm—Young & Thompson (57) ABSTRACT

A magnetic disk drive is provided, which decreases the profile or height of the drive itself without reliability degradation, realizing a low-profile and large-capacity magnetic disk drive. The drive comprises: (a) a rotatable magnetic disk around an axis; (b) a spindle motor for rotating the disk; (c) a magnetic head for writing information into the disk and for reading information from the disk; (d) an actuator for positioning the head at a desired position over the disk; (e) a disk enclosure for enclosing the disk, the motor, the head, and the actuator; (f) a circuit board fixed to the enclosure; the board having necessary circuits and necessary electronic elements for controlling operation of the drive; the board having a projecting part located outside a footprint of the enclosure; at least part of the elements being mounted on the projecting part. Preferably, the components mounted on the projecting part of the enclosure are higher than the components mounted on the part of the board that is overlapped with the enclosure. An additional circuit board may be provided over the projecting part of the enclosure.

5 Claims, 10 Drawing Sheets

| AREA | DEPTH (mm) |
|---|---|
| m | 1.7 |
| n | 2.0 |

LOW-PROFILE MAGNETIC DISK DRIVE

BACKGROUND OF THE INVENTION

1. Field of the Invention

The present invention relates to a magnetic disk drive and more particularly, to a low-profile magnetic disk drive that provides large storage capacity with a compact or thin body and that operates at high reliability.

2. Description of the Related Art

Conventionally, 3.5-inch and 2.5-inch magnetic disk drives typically comprise a disk enclosure (i.e., case) and an electronic circuit section (i.e., package) fixed to the back of the enclosure. The electronic circuit section or package, which performs the driving mechanism control and signal processing, includes circuit boards such as printed wiring boards (PWBs), in which necessary electronic circuits are formed and on which necessary electronic parts or components are mounted.

The disk enclosure includes a base which is usually made of aluminum (Al) material. On the base, a spindle motor and an actuator are mounted or fixed. The motor supports the magnetic disks and rotates the same around a specific axis. The actuator moves and positions the magnetic heads at desired positions over the disks. The actuator is driven by a rotary voice-coil motor. A flexible printed circuit (FPC) is connected to the actuator and the electronic circuit section (i.e., the package). The information to be written into the magnetic disks and the information to be read from the disks is transmitted as necessity by way of the FPC between the section and the heads.

The base on which the electronic components or parts are mounted is covered with a cover so as to form a sealed space therein, constituting the disk enclosure. The cover is usually made of stainless steel or Al material. The package or electronic circuit section, which is formed to have approximately the same footprint as the enclosure, is fixed to the back of the enclosure with screws.

Figure 1:
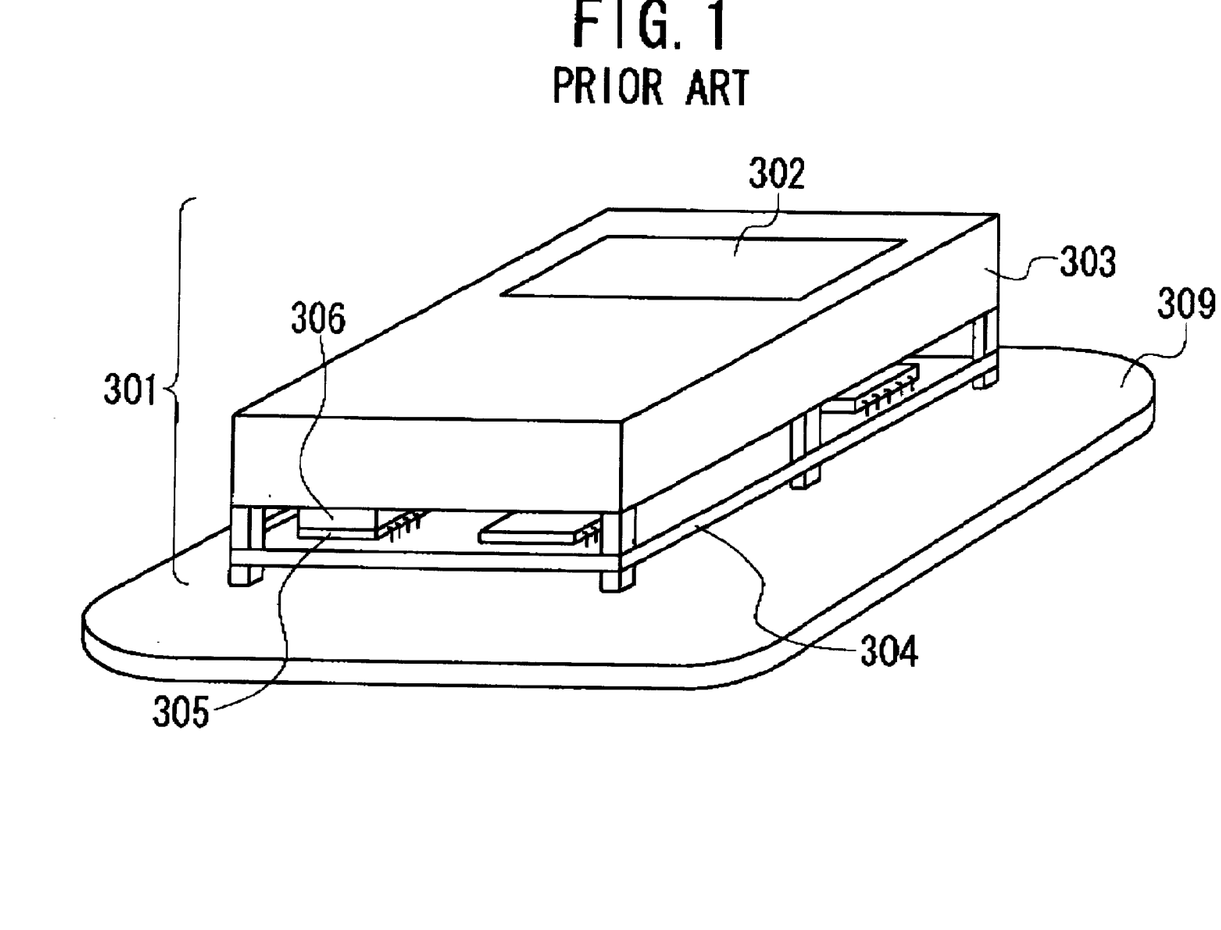
FIG. 1 is a schematic, perspective view showing an example of the conventional magnetic disk drives.

An example of the conventional magnetic disk drives of this type is disclosed in the Japanese Non-Examined Patent Publication No. 9-115279 publishes in 1997. FIG. 1 shows schematically the configuration of the drive disclosed therein.

In FIG. 1, the conventional magnetic disk drive 301 comprises a body or disk enclosure 303 and a circuit board (i.e., package) 304. Electronic components or parts such as an Integrated Circuit (IC) chip 305 are mounted on the board 304. The body or enclosure 303 is fixed to a specific wall 309 of the casing of an apparatus or system. A thermally conducting sheet 306 is provided between one of the IC chip 305 and the enclosure 303 to contact therewith, thereby dissipating the heat generated in the board or package 304 and the enclosure 303 into the atmosphere due to heat conduction. A label 302, which indicates the product name, specification, and so forth, is attached to the surface of the enclosure 303.

A thermally conducting sheet may be provided between the enclosure 303 and the wall 309.

The basic configuration of the magnetic disk drive comprising the disk enclosure and the package has already been standardized. Also, the position of mounting screws for mounting the drive itself to an apparatus or system (e.g., personal computers and server computers), and the position of connectors for electrical connection to the apparatus or system have been defined. This is to ensure the disk drive to be mounted in a specified place of the apparatus or system with high compatibility.

With the conventional magnetic disc drives of this type, there are the following problems.

The first problem is that the height or profile of the drive is difficult to be lowered. This is because the disk enclosure and the electronic component package are formed to have approximately the same footprint and then, they are stacked and coupled together.

In recent years, there is the tendency that semiconductor elements or components designed for the magnetic disk drives, such as hard disc controllers (HDCs) and channel ICs, have been integrated and downsized more than ever. However, these elements or components have still occupied a considerably large space. Also, some of the components, for example, electrically programmable read-only memories (EPROMs), regulators, and capacitors, may be as high as 3 mm to 5 mm. Thus, if all these components are arranged in approximately the same footprint as the disk enclosure, it is obvious that the overall height of the magnetic disk drive itself will be considerably large.

As described above, the outline or contour of the magnetic disc drives have been standardized. Also, there has ever been no strong demand to make the drives thinner. Thus, it may be said that the existing height of the drives has never caused any disadvantage or inconvenience.

However, recently, it is anticipated that the magnetic disk drives will be built in various home appliances in the near future to satisfy the specific consumer's needs, such as recording of the video data (i.e., image files) in many households. If so, the standardized profile of the drives induces inconvenience for mounting or setting-up of the drives. For example, if magnetic disk drives are incorporated into low-profile home appliances, such as wall-hung television (TV) sets, the dedicated space for the drives is difficult to be provided.

The thinner the magnetic disk drives, the more advantageous they are in mounting or setting-up. Therefore, if 2.5-inch magnetic disks are used for this purpose instead of 3.5-inch ones, the profile of the drives will be lower. In this case, however, there arises a problem that 2.5-inch magnetic disks provide insufficient storage capacity, in other words, desired storage capacity for video data recording is unable to be ensured.

Here, it is supposed that the 2.5-inch disk has a storage capacity as much as 10 gigabytes (GB). In this case, if the disk is used to record a digital broadcast program which has been planned to start in the year 2001 in Japan, the recordable time is as short as about 3 hours for standard TV (STV) and as short as about 40 minutes for high-definition TV (HDTV). As a result, it is difficult or unable to propose as attractive products with the 2.5-inch disk. This means that the 3.5-inch disk must to be used for this purpose because it enables larger storage capacity.

The second problem is that the rigidity of the hard disk drive degrades as its height is decreased, thereby degrading the reliability against the compression or pressing force to the disk enclosure.

Usually, because of the standard, the disk thickness of 0.8 mm, the head slider thickness of 0.3 mm, and the inter-disk gap of about 0.2 mm are unable to be changed. Also, various restrictions are present to decrease the motor height from the viewpoint of high-speed disk rotation. Accordingly, the base thickness may be decreased. In this case, however, there arises a problem that the rigidity of the disk drive itself is lowered according to the decreasing thickness of the base, because the base plays an important role to support or provide the desired rigidity. The lowered rigidity will cause vibrational disturbance, resulting in reliability degradation.

SUMMARY OF THE INVENTION

Accordingly, an object of the present invention is to provide a magnetic disk drive that decreases the profile or height of the drive itself without rigidity degradation.

Another object of the present invention is to provide a magnetic disk drive that decreases the profile or height of the drive itself without reliability degradation.

Still another object of the present invention is to provide a magnetic disk drive that realizes large capacity with a lower profile or height.

The above objects together with others not specifically mentioned will become clear to those skilled in the art from the following description.

A magnetic disc drive according to the present invention comprises:
- (a) a rotatable magnetic disk around an axis;
- (b) a spindle motor for rotating the disk;
- (c) a magnetic head for writing information into the disk and for reading information from the disk;
- (d) an actuator for positioning the head at a desired position over the disk;
- (e) a disk enclosure for enclosing the disk, the motor, the head, and the actuator;
- (f) a circuit board fixed to the enclosure;
    the board having necessary circuits and necessary electronic elements for controlling operation of the drive;
    the board having a projecting part located outside a footprint of the enclosure;
    at least part of the elements being mounted on the projecting part.

With the magnetic disk drive according to the present invention, the circuit board has the projecting part located outside the footprint of the disk enclosure and at the same time, at least a part of the electronic elements are mounted on the projecting part. Thus, if the tall (i.e., high-profile) components are mounted on the projecting part of the circuit board while the short (i.e., low-profile) components are mounted on the remaining part, the height of the disk enclosure can be decreased. This means that the height of the magnetic disk drive itself can be decreased.

On the other hand, since it is unnecessary to decrease the height of the disk enclosure, the rigidity of the enclosure is not lowered. Thus, reliability degradation does not occur.

As a result, the profile or height of the magnetic disk drive itself can be decreased without reliability degradation. Also, a low-profile and large-capacity magnetic disk drive can be realized.

In a preferred embodiment of the drive according to the invention, the board has an overlapping part located in the footprint of the enclosure. The components mounted on the projecting part of the board are higher in average than the components mounted on the overlapping part thereof.

In another preferred embodiment of the drive according to the invention, the board has an overlapping part located in the footprint of the enclosure. The components equal to or lower than a specific reference height are mounted on the overlapping of the board. The components higher than the specific reference height are mounted on the projecting part of the board.

In still another preferred embodiment of the drive according to the invention, an additional circuit board is provided over the projecting part of the enclosure located outside the footprint of the enclosure. In this embodiment, it is preferred that the additional circuit board is electrically connected to the board having the projecting part by way of a connector.

In a further preferred embodiment of the drive according to the invention, the enclosure and the circuit board form a shape approximately a same as a CD-ROM case.

In a still further preferred embodiment of the drive according to the invention, the magnetic disk is 2.5 inch, 3.5 inch, or 5 inch in diameter.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

A magnetic disk drive according to a first embodiment of the invention has the structure shown in FIGS. 2, 3, and 4A to 4C.

Figure 2:
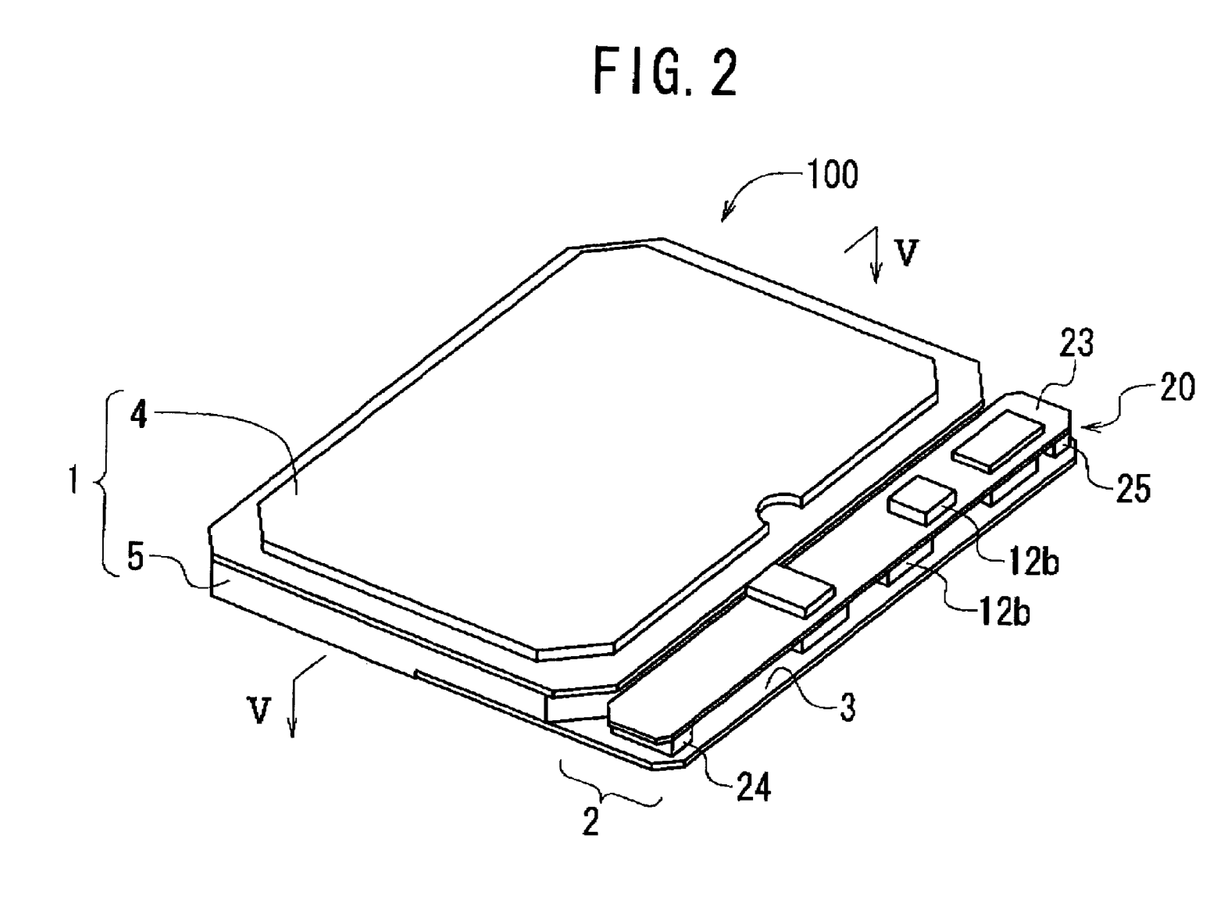
FIG. 2 is a schematic, perspective view showing a magnetic disk drive according to a first embodiment of the invention.
Figure 3:
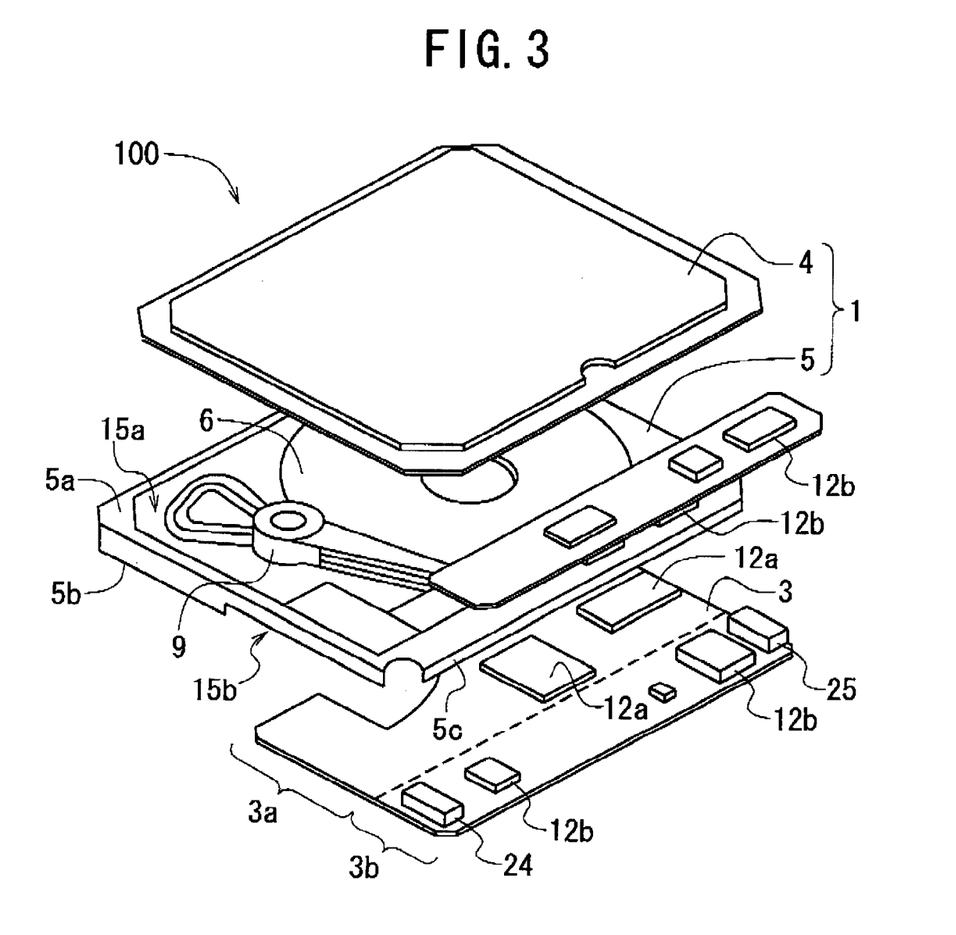
FIG. 3 is a schematic, exploded, perspective view showing the drive according to the first embodiment of FIG. 2.

As shown in FIGS. 2 and 3, the magnetic disk drive 100 according to the first embodiment comprises a disk enclosure 1 having an approximately rectangular plate-shaped base 5 with a specified thickness or height and a plate-shaped cover 4 with an approximately the same plan shape as the base 5.

Figure 5:
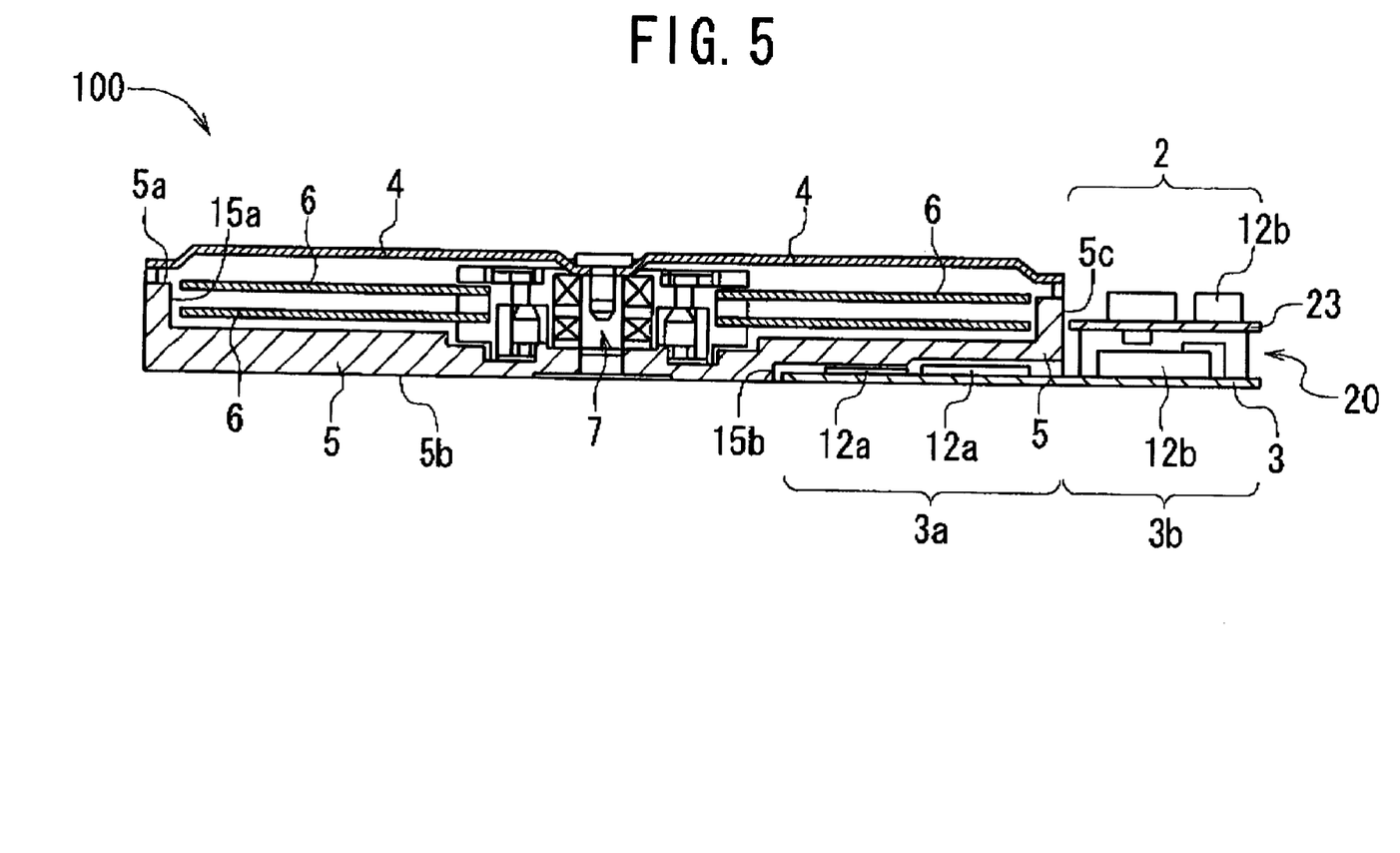
FIG. 5 is a cross-sectional view along the line V—V in FIG. 2.

On the top surface 5a of the base 5, a recess or depression 15a with a specified plan shape is formed, as clearly shown in FIG. 5. The recess 15a occupies almost all the surface 5a and forms the inner space of the enclosure 1. On the bottom surface 5b of the base 5, a recess or depression 15b with a specified plan shape is formed. The recess 15b is locally placed on the side of the side face 5c of the base 5.

On the bottom surface 5b of the base 5, an electronic circuit section (i.e., package) 20 is fixed. The package 20 comprises main and sub circuit boards (e.g., PWBs) 3 and 23, and the electronic components mounted on the respective boards 3 and 23.

The main circuit board 3 has a first part 3a to be overlapped with the bottom surface 5b of the base 5 and a second part 3b projecting into the space 2 near the side face 5c of the base 5. The first part 3a is located inside the footprint of the base 5 while the second part 3b is located outside the same footprint and in the space 2. The first part 3a has an approximately the same plan shape as the recess 15b. The main board 3 is fixed to the bottom of the enclosure 1 with screws at the first part 3a in such a way that the first part 3a is entirely buried into the recess 15b. Thus, the bottom of the main board 3 is placed in substantially the same plane as the bottom surface 5b of the base 5.

The first part 3a of the main board 3 may be termed the "overlapping part" while the second part 3b thereof may be termed the "projecting part". The space 2, in which the second part 3b of the main board 3 and the sub board 23 are located, may be termed the "side space" hereinafter.

The sub circuit board 23 is located over the main circuit board 3 to be entirely overlapped with the same in the side space 2. The sub board 23 is electrically and mechanically connected to the main board 3 by way of connectors 24 and 25.

Figure 4A:
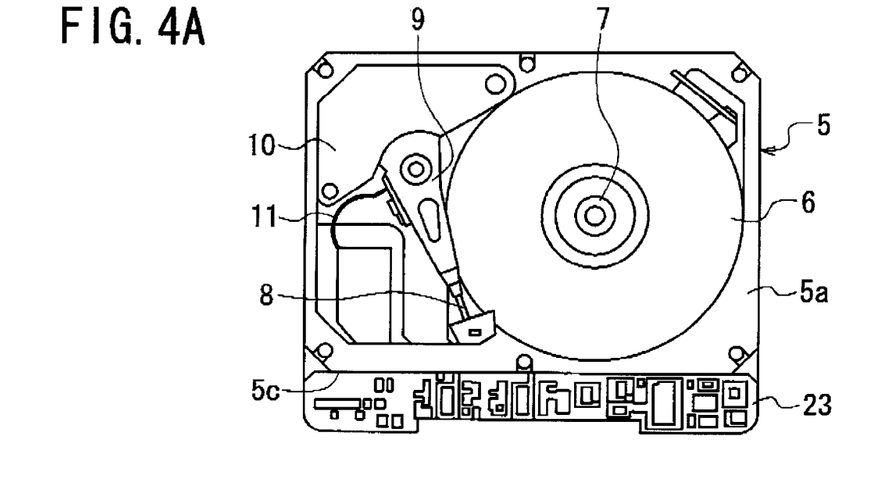
FIG. 4A is a schematic plan view showing the configuration of the drive according to the first embodiment of FIG. 2, where the cover is removed.

In the inner space of the disk enclosure 1 (which is formed by the cover 4 and the base 5), as shown in FIG. 4A, two magnetic disks 6, a spindle motor 7 for rotating the disks 6, magnetic heads 8 for writing and reading specific information into/from the disks 6, an actuator 9 for moving the head 8 along the disks 6 and positioning the same at a desired locations over the disks 6 are mounted.

Each of the disks 6 is a 3.5-inch magnetic-recordable disk. To make the drive 100 thinner, it is advantageous that the count of the disks 6 is as small as possible. Thus, only one magnetic disk is most preferred form the viewpoint of lower profile. However, taking the purpose of image-file recording into consideration, it is preferred that the storage capacity is as large as possible. As a result, while the possible recording-density of the disks 6 is considered, it is appropriate that the storage capacity is set as approximately 30 GB to 40 GB with the two disks 6.

The motor 7 and the actuator 8 are fixed to the base 5 in the enclosure 1. The actuator 9, which is driven by a rotary voice-coil motor 10, is connected to one end of a FPC 11. The other end of the FPC 11 is connected to the package 20.

The information and electric signals are transmitted between the package 20 and the head 8 by way of the FPC 11.

Figure 4B:
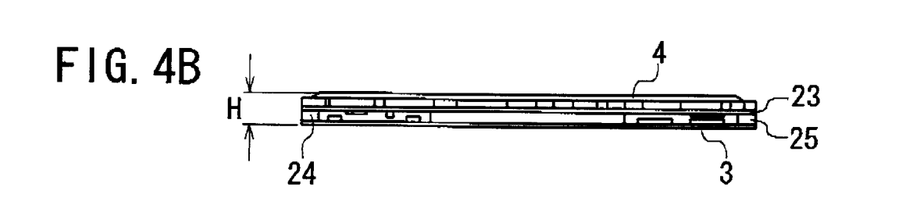
FIG. 4B is a schematic side view showing the configuration of the drive according to the first embodiment of FIG. 2.
Figure 4C:
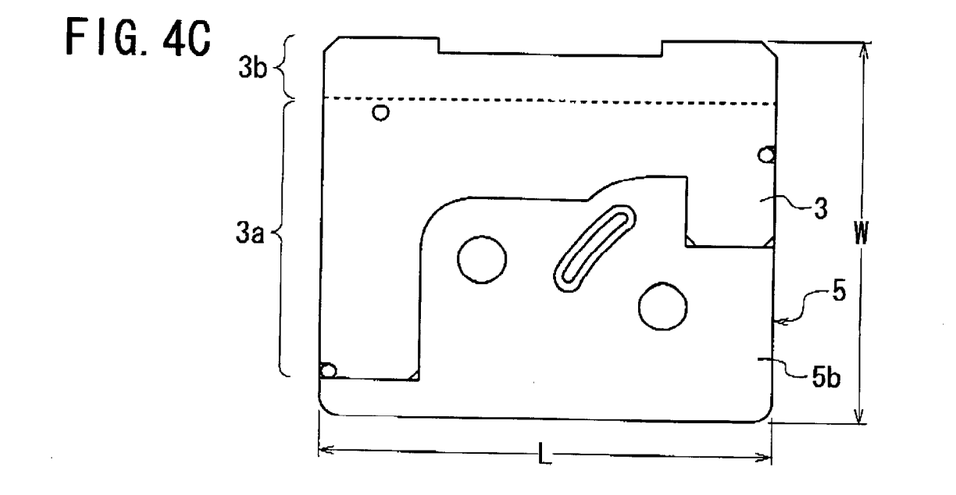
FIG. 4C is a schematic bottom view showing the configuration of the drive according to the first embodiment of FIG. 2.

Here, the width H, the length L, and the height H of the disk drive 100 are defined as shown in FIGS. 4B and 4C. In this case, for example, W×L×H=125 mm×142 mm×10 mm. This size is approximately equal to the well-known case or container for the CD-ROM disk. This profile may be adopted as the form factor of new low-profile hard disk drives.

Since the drive 100 has an approximately the same size and shape as the existing CD-ROM case, there is an additional advantage that the drive 100 itself is easy-handling, it can cope with the existing case, and it has a familiar external appearance for the users or consumers.

FIG. 5 shows the cross section of the drive 100 along the center line of the spindle motor 7, which is along the line V—V in FIG. 2.

As seen from FIGS. 3 and 5, short (low-profile) electronic components 12a are mounted on the first part 3a of the main board 3, which are located in the recess 15b of the base 3. Also, tall (high-profile) electronic components 12b are mounted on the second part 3b of the main board 3, which is projecting laterally from the base 5 into the side space 2. Tall electronic components 12b are further mounted on the sub board 23. The sub board 23 is not overlapped with the base 5 and the enclosure 1.

Figure 6A:
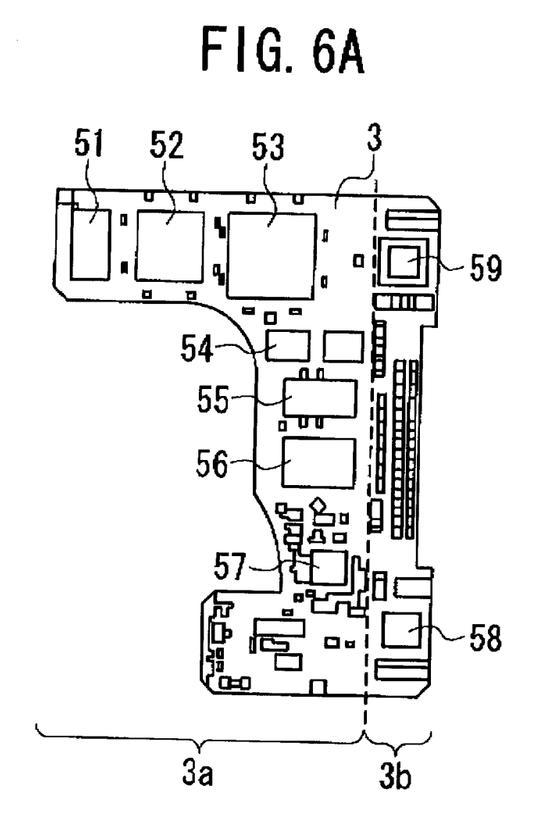
FIG. 6A is a schematic plan view showing an concrete example of the main circuit board of the drive according to the first embodiment of FIG. 2, where various electronic components are mounted on the main board.
Figure 6B:
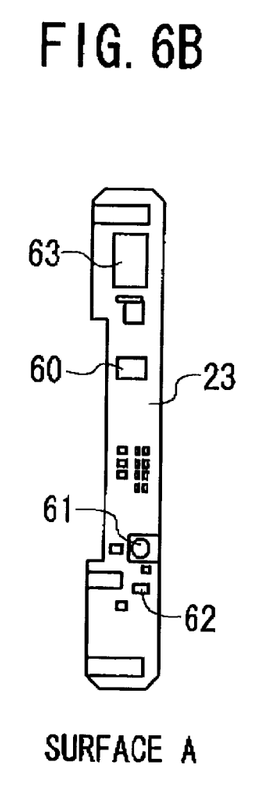
FIG. 6B is a schematic plan view showing an concrete example of the sub board of the drive according to the first embodiment of FIG. 2, where various electronic components are mounted on the surface A of the sub board.
Figure 6C:
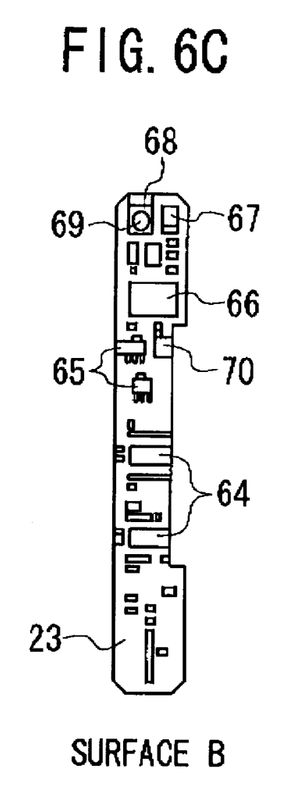
FIG. 6C is a schematic plan view showing an concrete example of the sub board of the drive according to the first embodiment of FIG. 2, where various electronic components are mounted on the surface B (opposite to the surface A) of the sub board.

FIGS. 6A to 6C show examples of arrangement of concrete electronic components 51 to 70 on the main and sub circuit boards 3 and 23. The type and maximum height of these components 51 to 70 thus arranged are listed in Table 1 below.

TABLE 1

| POSITION | SYMBOL | ELECTRIC PARTS DESCRIPTION | MAXIMUM HEIGHT (mm) |
|---|---|---|---|
| BACK OF ENCLOSURE | 51 | FROM | 1.2 |
| | 52 | PLD | 1.6 |
| | 53 | MPU | 1.7 |
| | 54 | SRAM | 1.22 |
| | 55 | SDRAM | 1.2 |
| | 56 | HDC | 1.6 |
| | 57 | CHANEL | 1.4 |
| SIDE SPACE | 58 | SERVO DRIVER | 1.6 |
| | 59 | EPROM | 5.0 |
| | 60 | EEPROM | 2.0 |
| | 61 | COIL | 5.1 |
| | 62 | DIODE | 2.2 |
| | 63 | PZT DRIVER | 2.65 |
| | 64 | FILTER | 1.8 |
| | 65 | REGULATOR | 1.8 |
| | 66 | REGULATOR | 2.7 |
| | 67 | CONDENSER | 1.8 |
| | 68 | FET | 1.8 |
| | 69 | COIL | 3.5 |
| | 70 | CONDENSER | 2.8 |

As shown in FIGS. 6A to 6C and Table 1, the tall components 12b are arranged on the second part 3b of the main board 3 and the sub board 23. At the same time, the short components 12a are arranged on the first part 3a of the main board 3 and located in the recess 15b of the base 5. Thus, the overall height H of the drive 100 itself can be decreased to an extremely small value of 10 mm.

The short components 51 to 57 having the maximum height of 1.7 mm are mounted on the first part 3a of the main board 3. The tall components 58 to 70 having the minimum height of 1.6 mm and the maximum height of 5.1 mm are mounted on the second part 3a of the main board 3 and the upper and lower surfaces of the sub board 23.

Figure 7A:
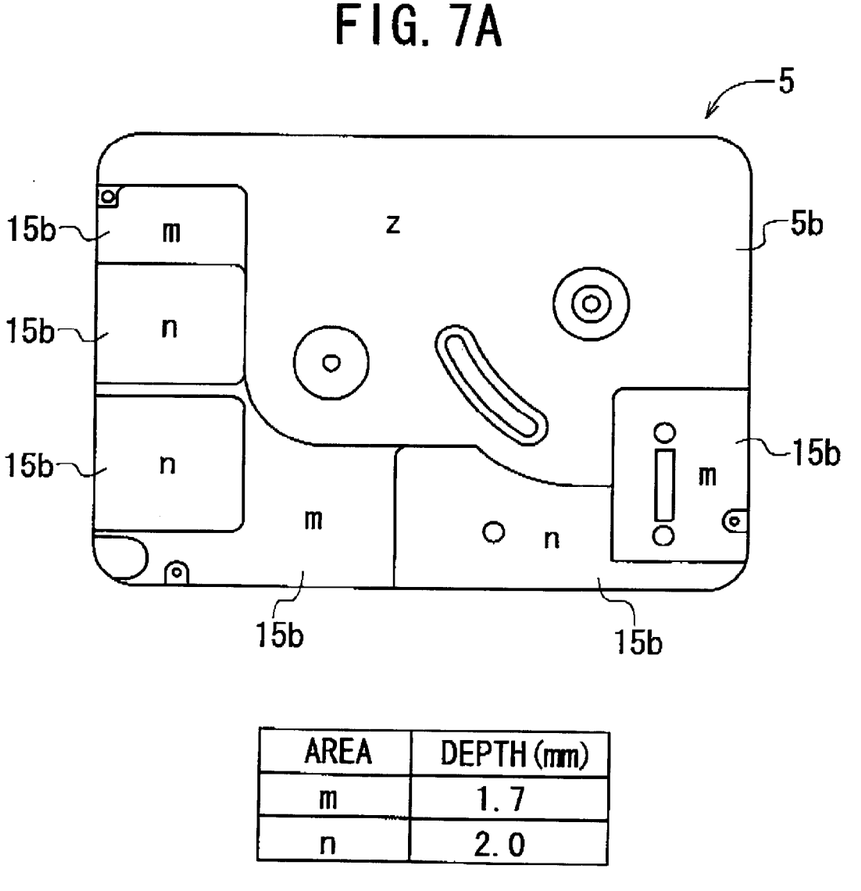
FIG. 7A is a schematic plan view showing the base of the drive according to the first embodiment of FIG. 2.
Figure 7B:
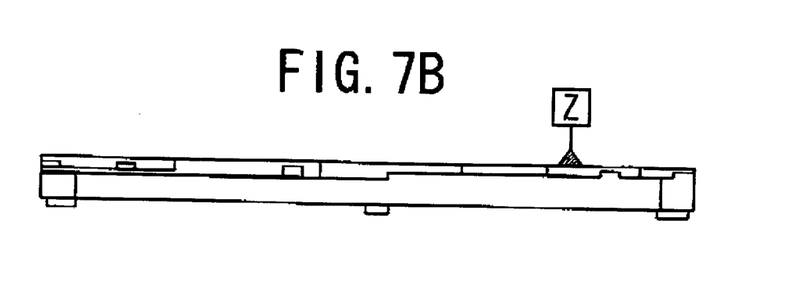
FIG. 7B is a schematic side view showing the base of the drive according to the first embodiment of FIG. 2.

FIGS. 7A and 7B show a concrete example of the base 5 used in the drive 100. As seen from FIG. 7A, the depth of the recess 15*b*, which is measured with reference to the region z where the recess 5*b* is not formed, is set at 1.7 mm in the respective regions m and 2.0 mm in the respective regions n.

The recess 15*b* is formed so as not to contact any of the short components 12*a*. Since the short components 12*a* arranged on the first part 3*a* of the main board 3 is 1.7 mm at the highest, the depth of the recess 15*b* can be as small as desired.

When the overall height H of the drive 100 is decreased, a problem of reliability degradation may occur. This is because the rigidity of the disk enclosure 1 is lowered as the height H decreases. With the drive 100 according to the first embodiment, however, the depth of the recess 15*b* is sufficiently small, as explained above. Therefore, the thickness of the base 5 can be set as 1.5 mm at the minimum. In average, the thickness of the base 5 can be set as 3 mm or greater. As a result, satisfactory rigidity of the enclosure 1 approximately equal to the rigidity of the conventional drives can be given.

With the magnetic disk drive 100 according to the first embodiment, the short components 12*a* are arranged on the first part 3*a* of the main board 3 that overlaps with the enclosure 1 while the tall components 12*b* are arranged on the second part 3*b* of the main board 3 that does not overlap with the enclosure 1 and is located in the side space 2. Also, the tall components 12*b* are arranged on the sub board 23 that does not overlap with the enclosure 1 and is located in the side space 2.

Accordingly, the overall height H of the drive 100 can be set at a value equal to the thickness of the disk enclosure 1, or equal to the sum of the thickness of the disk enclosure 1 and the minimum possible thickness of the main circuit board 3. Moreover, there is no need to make the base 5 thinner to absorb the thickness of the board 3.

As a result, the magnetic disk drive 100 according to the first embodiment provides a large storage capacity as desired with a low profile. Also, satisfactory high reliability is obtained even if the profile of the drive 100 itself is lowered.

Second Embodiment

Figure 8:
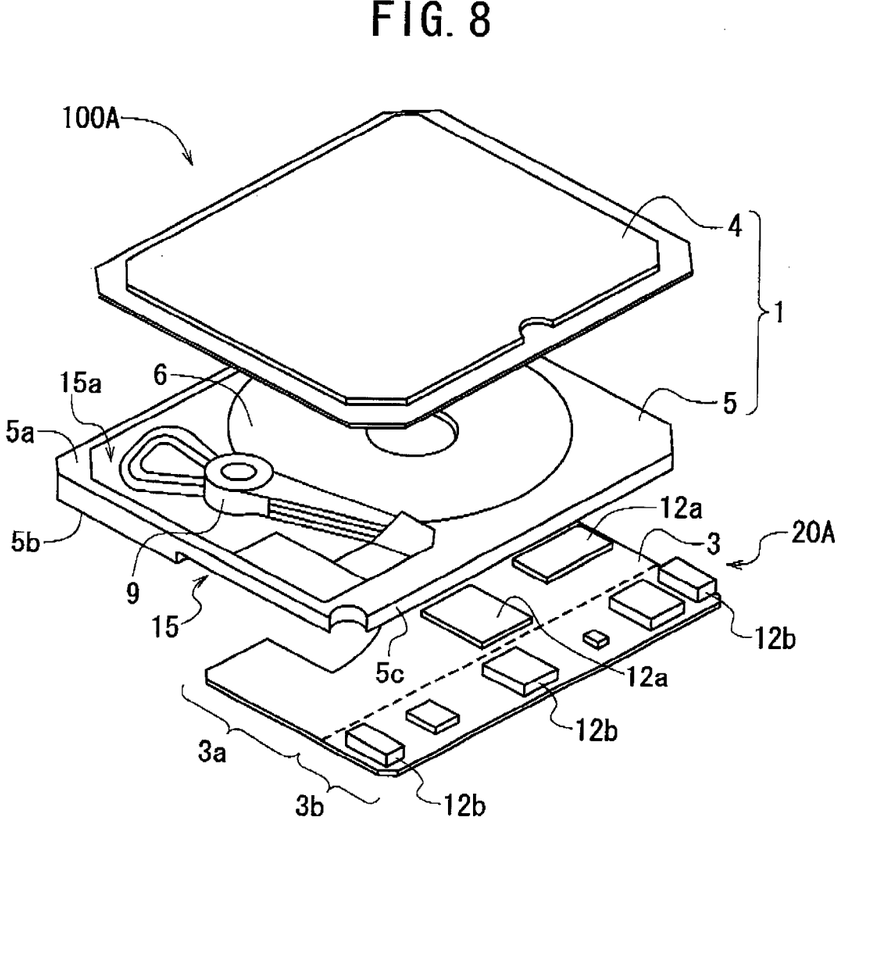
FIG. 8 is a schematic, exploded, perspective view showing a magnetic disk drive according to a second embodiment of the invention.
Figure 9A:
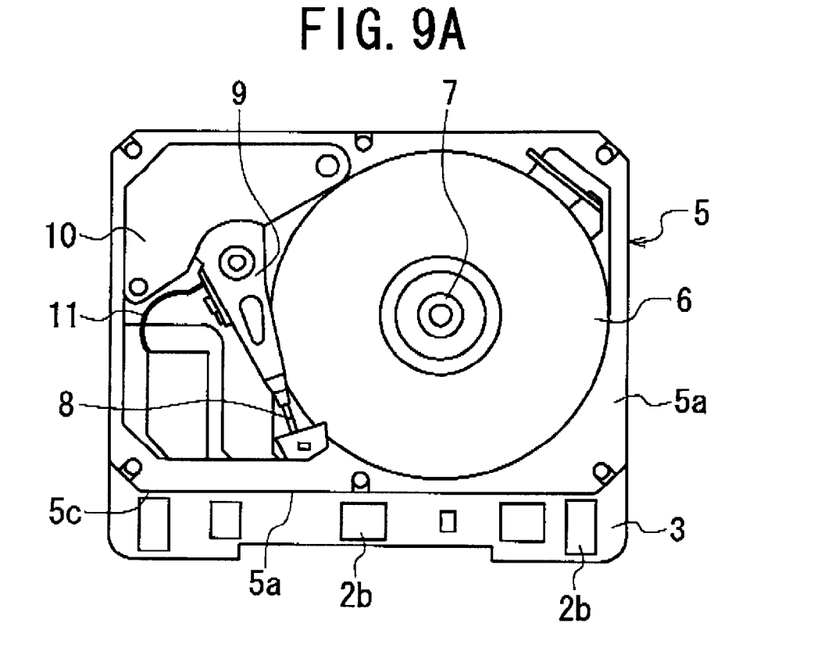
FIG. 9A is a schematic plan view showing the configuration of the drive according to the second embodiment of FIG. 8, where the cover is removed.
Figure 9B:
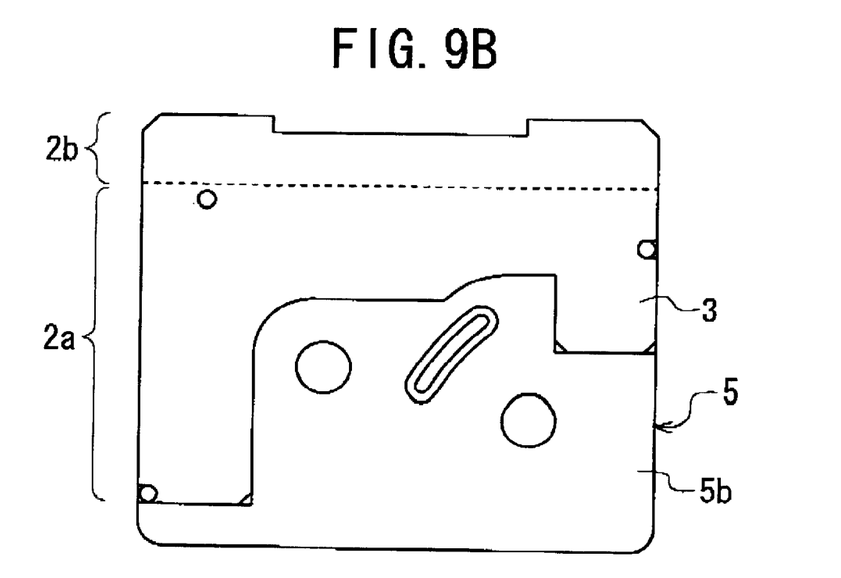
FIG. 9B is a schematic bottom view showing the configuration of the drive according to the second embodiment of FIG. 8.

FIG. 8 and FIGS. 9A and 9B show a magnetic disk drive 100A according to a second embodiment of the invention, which has the same configuration as the drive 100 according to the first embodiment except that the sub circuit board 23 is omitted. Therefore, the explanation on the same configuration is omitted here for simplification of description by attaching the same reference symbols as those in the drive 100 to the same elements in FIGS. 8, 9A and 9B.

With the drive 100A according to the second embodiment, the package 20A comprises the electronic components 12*a* and 12*b* mounted respectively on the first and second parts 3*a* and 3*b* of the main board 3 alone.

With the drive 100A according to the second embodiment, the same advantages as those in the first embodiment are given.

Third Embodiment

Figure 10:
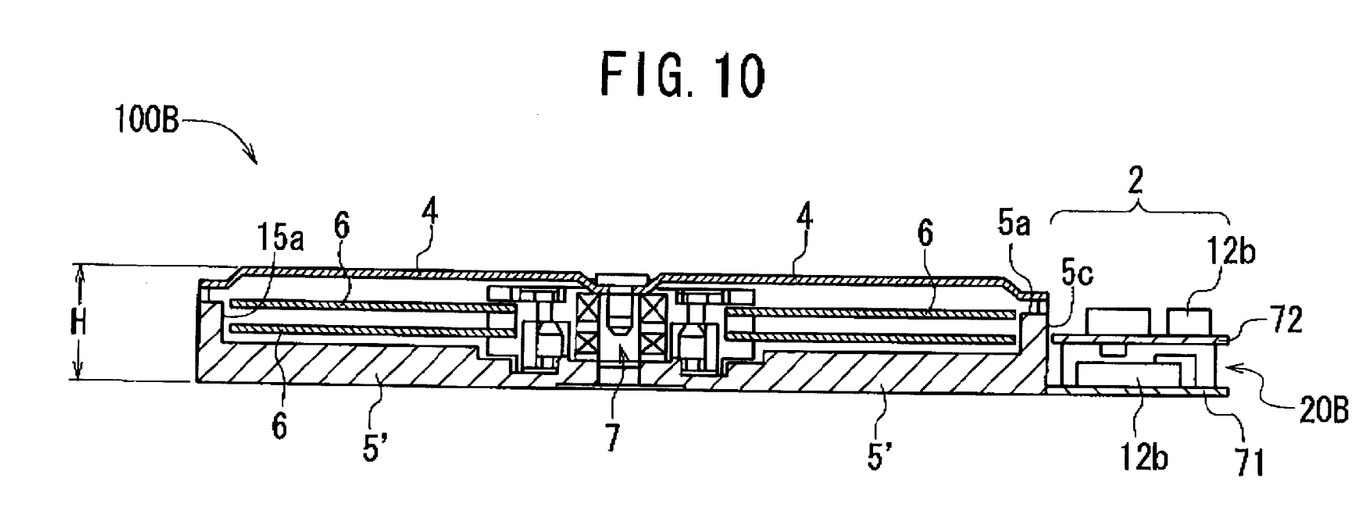
FIG. 10 is a schematic cross-sectional view showing a magnetic disk drive according to a third embodiment of the invention, which is along the same line as the line V—V in FIG. 2.

FIG. 10 shows a magnetic disk drive 100B according to a third embodiment of the invention, which has the same configuration as the drive 100 according to the first embodiment except that the package 20B is provided in the side space 2 alone. Therefore, the explanation on the same configuration is omitted here for simplification of description by attaching the same reference symbols as those in the drive 100 to the same elements in FIG. 10.

With the drive 100 according to the first embodiment, the package 20 covers part of the bottom surface of the enclosure 1. However, if integration and miniaturization of the necessary electronic components progresses further in the near future, the count of the necessary components will decrease. In this case, the package 20 will occupy a narrower area, The drive 100B according to the third embodiment is applicable to this case.

Specifically, as shown in FIG. 10, the package 20B is located in the side space 2 without covering or overlapping the bottom of the enclosure 1. In this embodiment, the recess 15*b* needs not be formed in the base 5' of the enclosure 1 and thus, the height of the base 5' can be set smaller by the depth of the recess 15*b*. As a result, the overall height H of the drive 100B can be further decreased compared with the drives 100 and 100A according to the first and second embodiments as described above. This is an additional advantage of the third embodiment.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A magnetic disc drive comprising:

a base having a first recess in a first surface thereof in which are mounted a rotatable magnetic disk, a motor for rotating the disk, a magnetic head for reading and writing information on the disk, and an actuator for positioning the magnetic head, said base having a second recess in a second surface thereof opposite said first surface, said second recess extending inwardly from an edge of said base; and a circuit board fixed to said base and carrying at least one integrated circuit memory device and plural electronic components for operating the magnetic disc drive, wherein said circuit board has an overlapping part that is within said second recess and a projecting part that is outside said second recess and that projects beyond said edge of said base, wherein said at least one integrated circuit memory device is mounted on said projecting part and plural of the electronic components are mounted on said overlapping part, said at least one integrated circuit memory device being higher than said electronic components mounted on said overlapping part.

2. The magnetic disc drive of claim 1, wherein said integrated circuit memory device is an EPROM.

3. The magnetic disc drive of claim 1, wherein at least one of said electronic components is also mounted on the projecting part.

4. The magnetic disc drive of claim 3, wherein said at least one electronic component is one of a condenser, a coil, a regulator, and a driver.

5. The magnetic disc drive of claim 1, wherein the projecting part has mounted thereon a sub circuit board that is spaced from said projecting part, and wherein plural ones of the electronic components are mounted on each of the projecting part and the sub circuit board.

* * * * *